United States Patent
Yan et al.

(10) Patent No.: US 12,356,483 B2
(45) Date of Patent: Jul. 8, 2025

(54) SYSTEMS AND METHODS FOR PREVENTING USER DEVICE PINGING IN ASYNCHRONOUS COMMUNICATION MODE

(71) Applicant: Verizon Patent and Licensing Inc., Basking Ridge, NJ (US)

(72) Inventors: Lixia Yan, Basking Ridge, NJ (US); Violeta Cakulev, Milburn, NJ (US); Lalit R. Kotecha, San Ramon, CA (US); Robert Avanes, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 419 days.

(21) Appl. No.: 18/066,824

(22) Filed: Dec. 15, 2022

(65) Prior Publication Data
US 2024/0205999 A1   Jun. 20, 2024

(51) Int. Cl.
*H04W 76/18* (2018.01)
*H04W 76/30* (2018.01)

(52) U.S. Cl.
CPC ........... *H04W 76/18* (2018.02); *H04W 76/30* (2018.02)

(58) Field of Classification Search
CPC ..... H04W 76/16; H04W 76/30; H04W 76/12; H04W 76/22; H04W 76/32
USPC ......................................... 370/310, 328–330
See application file for complete search history.

(56) References Cited

U.S. PATENT DOCUMENTS

| | | | | |
|---|---|---|---|---|
| 2020/0015314 A1* | 1/2020 | Dao | ...................... | H04L 67/142 |
| 2021/0337404 A1* | 10/2021 | Sun | ...................... | H04W 72/23 |
| 2021/0352619 A1* | 11/2021 | Ryu | ...................... | H04W 68/02 |
| 2022/0022101 A1* | 1/2022 | Wang | ................. | H04M 15/8228 |
| 2023/0021904 A1* | 1/2023 | He | .......................... | H04L 69/40 |
| 2023/0422293 A1* | 12/2023 | Qiao | .................... | H04W 72/566 |

* cited by examiner

*Primary Examiner* — Candal Elpenord (57) ABSTRACT

A network device may receive a context creation request based on a protocol data unit (PDU) session establishment request for establishing a PDU session with a user device, and may generate a policy context request based on receiving the context creation request. The network device may provide the policy context request to a policy control function (PCF), and may receive, from the PCF and based on the policy context request, policy rules for the PDU session. The network device may receive, from the PCF, a terminate PDU session notification indicating that a binding support function (BSF) is unreachable, and may generate, based on the terminate PDU session notification, a PDU session release command that includes a cause code indicating an issue with the BSF and an instruction to not reinitiate the PDU session. The network device may cause the PDU session release command to be provided to the user device.

20 Claims, 6 Drawing Sheets

SYSTEMS AND METHODS FOR PREVENTING USER DEVICE PINGING IN ASYNCHRONOUS COMMUNICATION MODE

BACKGROUND

A binding support function (BSF) is a fifth-generation (5G) core network function that supports receive (Rx) Diameter message routing and voice-over-new radio (VoNR).

DETAILED DESCRIPTION OF EXAMPLE EMBODIMENTS

The following detailed description of example implementations refers to the accompanying drawings. The same reference numbers in different drawings may identify the same or similar elements.

During an Internet protocol (IP) multimedia subsystem (IMS) protocol data unit (PDU) session setup, a policy control function (PCF) of a 5G core network may attempt to register a subscriber's IMS session information (e.g., an IP address of a user device and a fully qualified domain name (FQDN)/IP address of the PCF) with a BSF. When a subscriber makes a voice call with a user device, a proxy-call session control function (P-CSCF) may query the BSF to identify which PCF handles the PDU session, and may route the voice call request to the identified PCF. However, the user device may potentially keep pinging (e.g., attempting to reinitiate the PDU session) the 5G radio access network (RAN) and core network when the BSF is nonoperational. If the BSF is nonoperational or a connection between the PCF and the BSF is nonoperational, the PCF may notify a session management function (SMF) to release the IMS PDU session. This triggers the user device to reinitiate the PDU session setup request with a very high frequency, causing a network signaling message storm. Thus, current network configurations consume computing resources (e.g., processing resources, memory resources, communication resources, and/or the like), networking resources, and/or other resources associated with handling multiple reinitiated PDU session setup requests by a user device, handling a network signaling message storm caused by the user device reinitiating PDU session setup requests, providing a poor user experience for a user of a user device, and/or the like.

Some implementations described herein provide a network device (e.g., an SMF) that prevents user device pinging in asynchronous communication mode. For example, the SMF may receive a context creation request based on a PDU session establishment request associated with establishing a PDU session with a user device, and may generate a policy context request based on receiving the context creation request. The SMF may provide the policy context request to a PCF, and may receive, from the PCF and based on the policy context request, policy rules for the PDU session. The SMF may receive, from the PCF, a terminate PDU session notification indicating that a BSF is unreachable, and may generate a new policy context request based on receiving the terminate PDU session notification. The SMF may provide the new policy context request to a backup PCF, and may receive, from the backup PCF and based on the new policy context request, new policy rules for the PDU session. The SMF may receive, from the backup PCF, a new terminate PDU session notification indicating that the BSF is unreachable, and may generate, based on the new terminate PDU session notification, a PDU session release command that includes a cause code indicating an issue with the BSF and an instruction to not reinitiate the PDU session. The SMF may cause the PDU session release command to be provided to the user device, to instruct the user device to not reinitiate the PDU session.

In this way, the SMF prevents user device pinging in asynchronous communication mode. For example, if a BSF is nonoperational and a PCF is unable to register with the BSF, the PCF may provide, to the SMF, a notification instructing the SMF to terminate a PDU session for a user device based on a cause code indicating that the BSF is not reachable. When the SMF receives the notification from the PCF, the SMF may attempt to establish the PDU session via another PCF. The other PCF may be unable to register with the BSF and may provide, to the SMF, another notification instructing the SMF to terminate a PDU session for the user device based on the cause code indicating that the BSF is not reachable. Based on the other notification from the other PCF, the SMF may generate a PDU session release command that includes a non-access stratum (NAS) code indicating that the BSF has an issue and instructing the user device to not reinitiate the PDU session setup. The SMF may provide the PDU session release command to the user device and the user device may not reinitiate the PDU session setup based on the PDU session release command. Thus, the SMF may conserve computing resources, networking resources, and/or other resources that would have otherwise been consumed by handling multiple reinitiated PDU session setup requests by a user device, handling a network signaling message storm caused by the user device reinitiating PDU session setup requests, providing a poor user experience for a user of a user device, and/or the like.

Figure 1A:
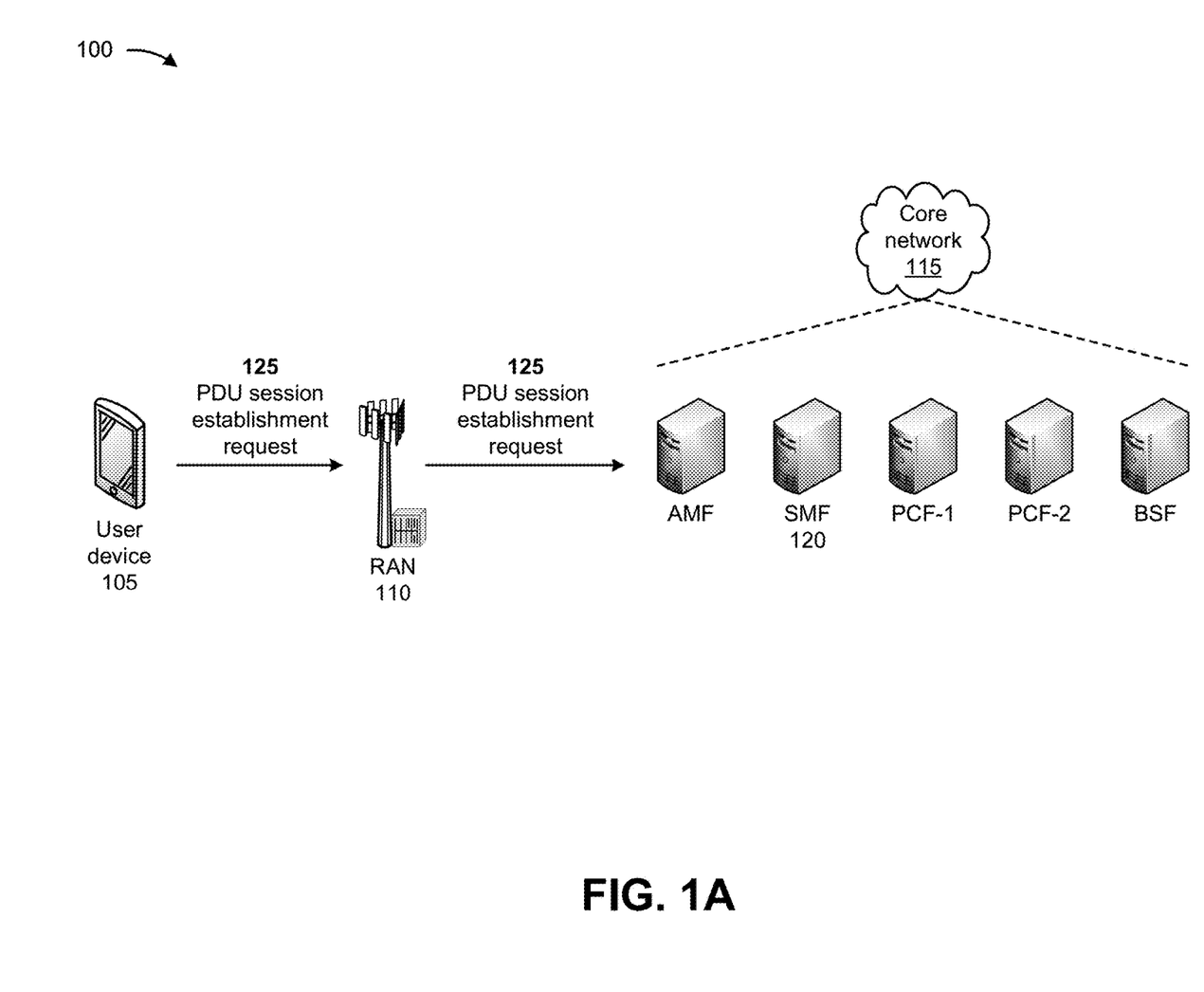
FIGS. 1A-1C are diagrams of an example associated with preventing user device pinging in asynchronous communication mode.
Figure 1B:
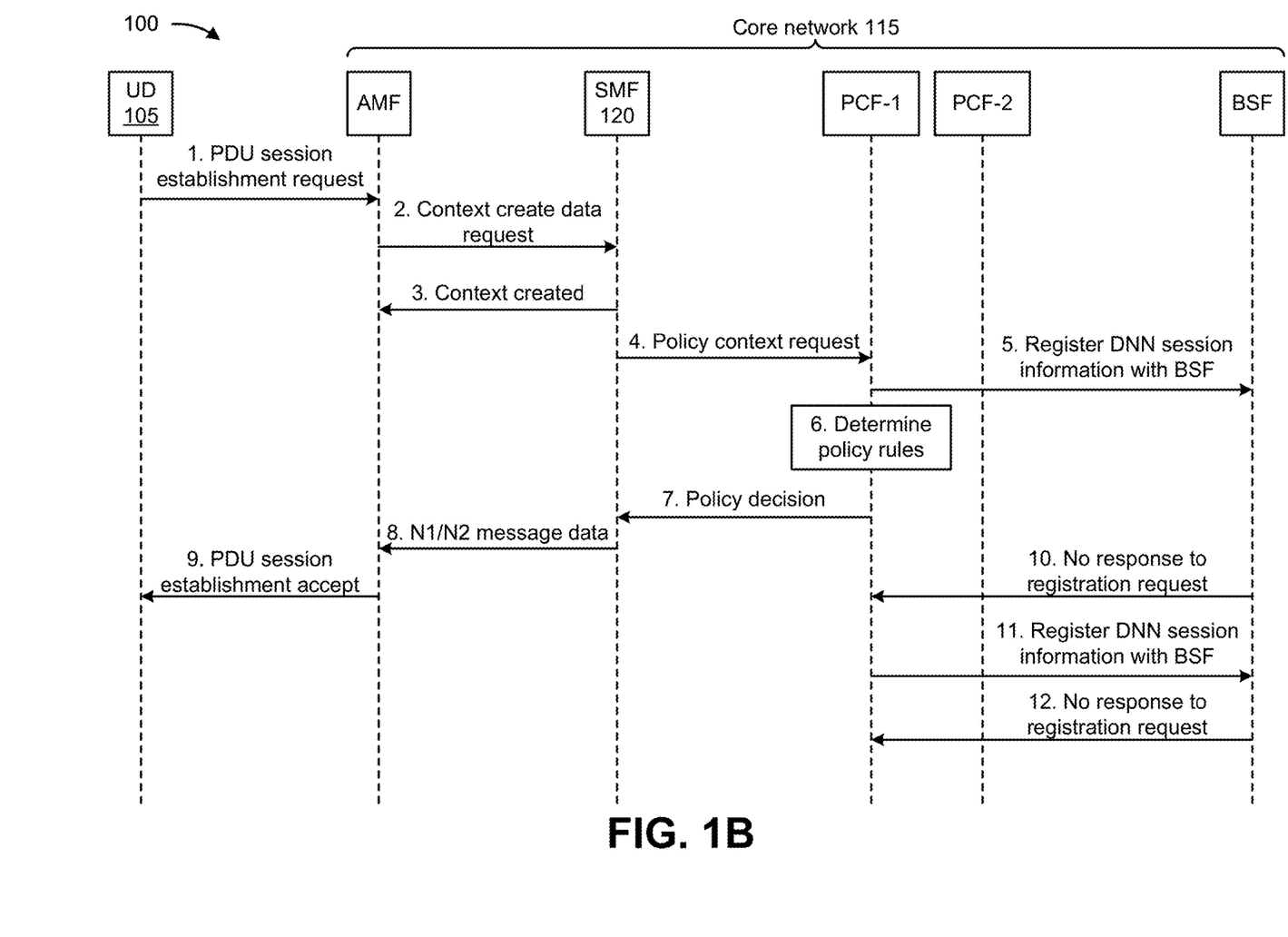
Figure 1C:
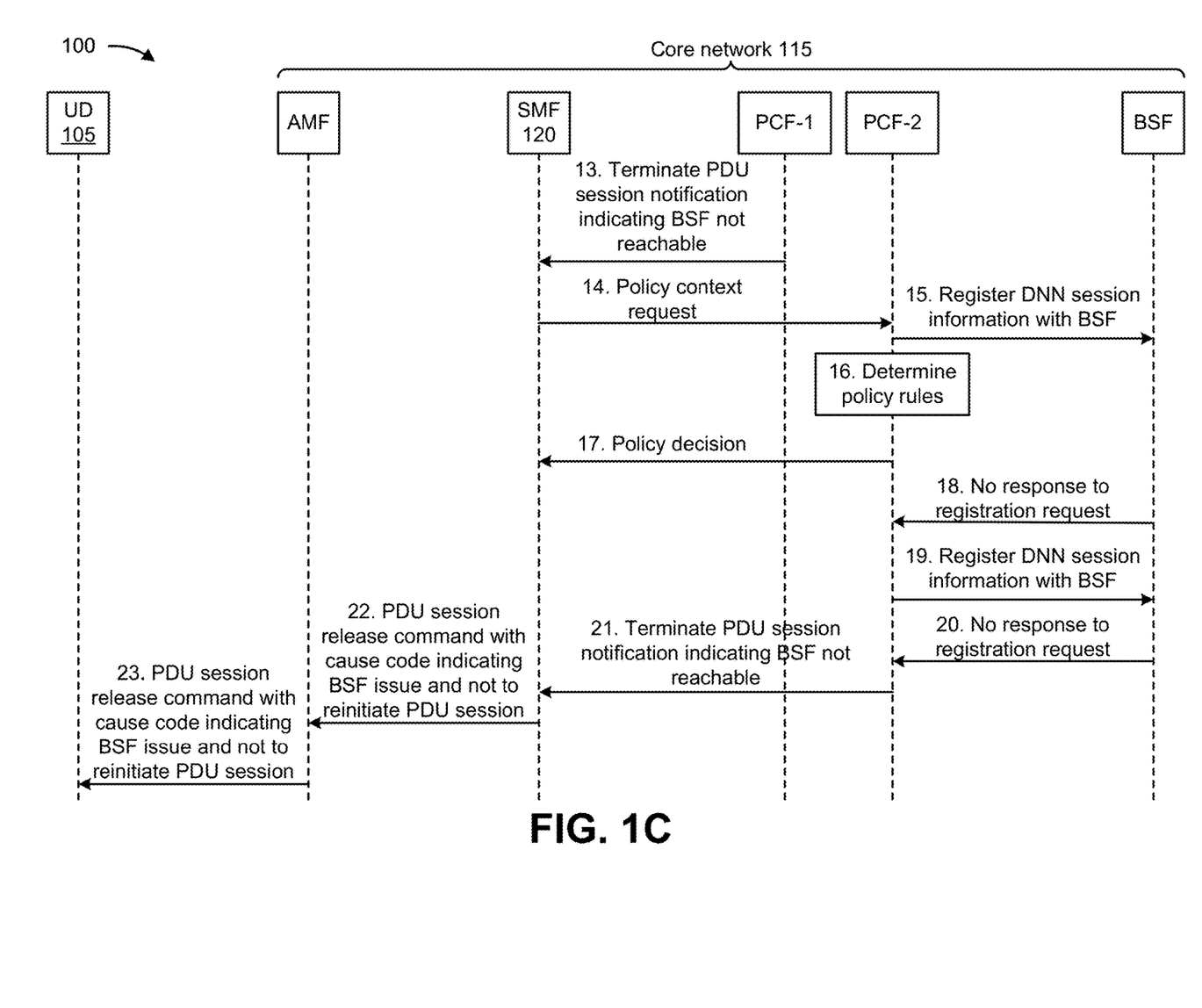

FIGS. 1A-1C are diagrams of an example 100 associated with preventing user device pinging in asynchronous communication mode. As shown in FIGS. 1A-1C, example 100 includes a user device 105, a RAN 110, and a core network 115 that includes an SMF 120, an access and mobility management function (AMF), and one or more PCFs. Further details of the user device 105, the RAN 110, the core network 115, the SMF 120, the AMF, and the PCF are provided elsewhere herein.

As shown in FIG. 1A, and by reference number 125, the user device 105 may provide a PDU session establishment request to the RAN 110, and the RAN 110 may provide the PDU session establishment request to the AMF. For example, the user device 105 may attempt to establish a PDU session with the core network 115, via the RAN 110, in order to communicate with another user device 105, an application server, a cloud computing environment, and/or the like. In order to establish the PDU session, the user device 105 may generate the PDU session establishment request that requests establishment of the PDU session with the RAN 110 and the core network 115. The PDU session establishment request may also include credentials of a user of the user device 105, an identifier of the user device 105, and/or the like. The user device 105 may provide the PDU session establishment request to the RAN 110, and the RAN 110 may forward the PDU session establishment request to the AMF. The AMF may receive the PDU session establishment request from the RAN 110.

The AMF may perform registration and authentication of the user device 105, via the RAN 110. For example, the AMF may be responsible for handling connection and mobility management tasks, such as registering and authenticating the user device 105 for establishment of the PDU session. The AMF, alone or in combination with other network elements of the core network 115, may review the information included in the PDU session establishment request, and may deny registration and/or authentication of the user device 105, for establishment of the PDU session, based on the information included in the PDU session establishment request. Alternatively, the AMF may allow registration and/or authentication of the user device 105, for establishment of the PDU session, based on the information included in the PDU session establishment request.

FIGS. 1B and 1C are call flow diagrams depicting steps associated with preventing user device pinging in asynchronous communication mode. As shown at step 1 of FIG. 1B, the user device 105 may provide the PDU session establishment request to the AMF, as described above in connection with FIG. 1A. As shown at step 2, the AMF may provide a context create data request to the SMF 120, and the SMF 120 may receive the context create data request. The context create data request may include a request to create context for the PDU session. The SMF 120 may create a session management context for the PDU session based on the context create data request. As shown at step 3, the SMF 120 may provide, to the AMF, an indication that the context is created for the PDU session. As shown at step 4, the SMF 120 may generate and provide, to a first PCF (PCF-1), a policy context request. The policy context request may include a request for the first PCF (PCF-1) to determine policy rules for the PDU session. The first PCF (PCF-1) may receive the policy context request.

As shown at step 5 of FIG. 1B, PCF-1 may register data network name (DNN) session information, of the PDU session, with the BSF. As shown at step 6, the PCF-1 may determine policy rules for the PDU session based on the policy context request, and may generate a policy decision that includes the determined policy rules. As shown at step 7, the PCF-1 may provide the policy decision to the SMF 120 without waiting for a response from the BSF regarding registration of the DNN session information. As shown at step 8, the SMF 120 may provide N1/N2 message data to the AMF. The N1 message data may provide the QoS information of the PDU session to the user device 105, and the N2 message may provide the QoS information of the PDU session to the RAN 110. As shown at step 9, the AMF may provide a PDU session establishment accept message to the user device 105. The PDU session establishment accept message may indicate, to the user device 105, that the PDU session establishment has been accepted.

As shown at step 10 of FIG. 1B, the PCF-1 may not receive, from the BSF, a response to the request to register the DNN session information (e.g., due to the BSF being nonoperational or a connection between PCF-1 and the BSF being nonoperational). As shown at step 11, PCF-1 may again attempt to register the DNN session information, of the PDU session, with the BSF. As shown at step 12, PCF-1 may again not receive, from the BSF, a response to the request to register the DNN session information (e.g., due to the BSF being nonoperational or a connection between PCF-1 and the BSF being operational).

As shown at step 13 of FIG. 1C, PCF-1 may generate and provide, to the SMF 120, a terminate PDU session notification indicating that the BSF is not reachable. When the SMF 120 receives the terminate PDU session notification from PCF-1, the SMF 120 may attempt to establish the PDU session via a second PCF (PCF-2). As shown at step 14, the SMF 120 may generate and provide, to PCF-2, a policy context request. The policy context request may include a request for PCF-2 to determine policy rules for the PDU session. PCF-2 may receive the policy context request. As shown at step 15, PCF-2 may register the DNN session information, of the PDU session, with the BSF. As shown at step 16, PCF-2 may determine policy rules for the PDU session based on the policy context request, and may generate a policy decision that includes the determined policy rules. As shown at step 17, PCF-2 may provide the policy decision to the SMF 120 without waiting for a response from the BSF regarding registration of the DNN session information.

As shown at step 18 of FIG. 1C, PCF-2 may not receive, from the BSF, a response to the request to register the DNN session information (e.g., due to the BSF being nonoperational or a connection between PCF-1 and the BSF being nonoperational). As shown at step 19, PCF-2 may again attempt to register the DNN session information, of the PDU session, with the BSF. As shown at step 20, PCF-2 may again not receive, from the BSF, a response to the request to register the DNN session information (e.g., due to the BSF being nonoperational or a connection between PCF-1 and the BSF being operational). As shown at step 21, PCF-2 may generate and provide, to the SMF 120, a terminate PDU session notification indicating that the BSF is not reachable.

When the SMF 120 receives the terminate PDU session notification from PCF-2, the SMF 120 may generate a PDU session release command that includes a cause code indicating an issue with the BSF and an instruction to not reinitiate the PDU session. As shown at step 22 of FIG. 1C, the SMF 120 may provide the PDU session release command to the AMF. The AMF may forward the PDU session release command to the user device 105 and the user device 105 may receive the PDU session release command. The user device 105 may not reinitiate the PDU session establishment based on the PDU session release command (e.g., based on the instruction to not reinitiate the PDU session), which may prevent a network signaling message storm by the user device 105.

Although implementations described herein indicate that the SMF 120 generates the PDU session release command that includes the cause code indicating the issue with the BSF and the instruction to not reinitiate the PDU session after receiving the terminate PDU session notification from the second PCF, in some implementations, the SMF 120 may generate the PDU session release command that includes the cause code indicating the issue with the BSF and the instruction to not reinitiate the PDU session after receiving the terminate PDU session notification from the first PCF.

In this way, the SMF 120 prevents user device 105 pinging in asynchronous communication mode. For example, if a BSF is nonoperational and a PCF is unable to register with the BSF, the PCF may provide, to the SMF 120, a notification instructing the SMF 120 to terminate a PDU session for the user device 105 based on a cause code indicating that the BSF is not reachable. When the SMF 120 receives the notification from the PCF, the SMF 120 may attempt to establish the PDU session via another PCF. The other PCF may be unable to register with the BSF and may provide, to the SMF 120, another notification instructing the SMF 120 to terminate a PDU session for the user device 105 based on the cause code indicating that the BSF is not reachable. Based on the other notification from the other PCF, the SMF 120 may generate a PDU session release command that includes an NAS code indicating that the BSF has an issue and instructing the user device 105 to not reinitiate the PDU session setup. The SMF 120 may provide the PDU session release command to the user device 105, and the user device 105 may not reinitiate the PDU session setup based on the PDU session release command. Thus, the SMF 120 may conserve computing resources, networking resources, and/or other resources that would have otherwise been consumed by handling multiple reinitiated PDU session setup requests by the user device 105, handling a network signaling message storm caused by the user device 105 reinitiating PDU session setup requests, providing a poor user experience for a user of the user device 105, and/or the like.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
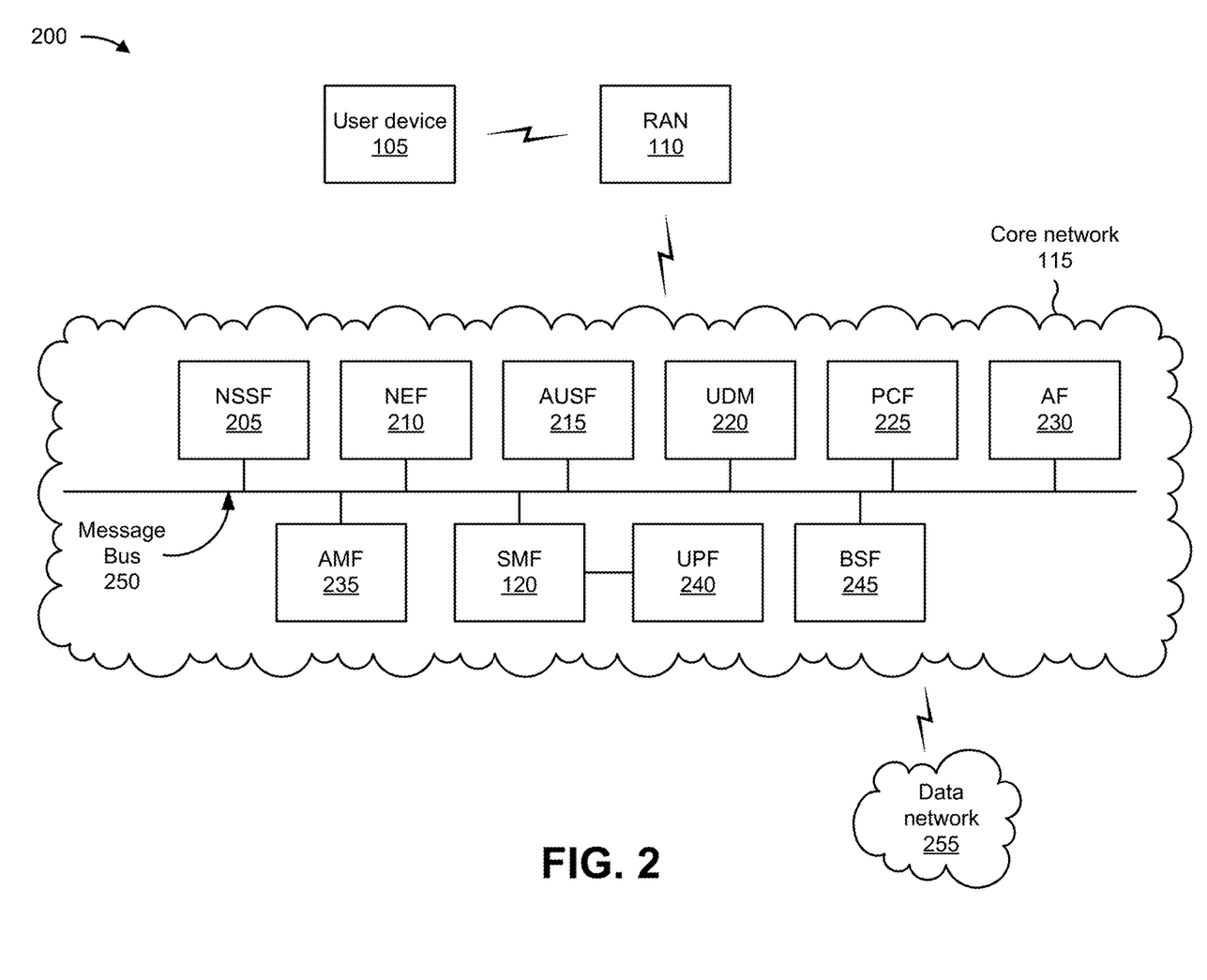
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, and a data network 255. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) component 220, a PCF 225, an application function (AF) 230, an AMF 235, the SMF 120, and/or a user plane function (UPF) 240. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the user device 105 in the wireless telecommunications system.

The UDM 220 includes one or more devices that store user data and profiles in the wireless telecommunications system. The UDM 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 120 includes one or more devices that support the establishment, modification, and release of communication sessions in the wireless telecommunications system. For example, the SMF 120 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The BSF 245 includes one or more devices that support Rx Diameter message routing and VoNR. The BSF 245 may allow the PCF 225 to register, update, and remove binding information from the BSF 245, and may allow network function consumers to discover a selected PCF 225.

The message bus 250 represents a communication structure for communication among the functional elements. In other words, the message bus 250 may permit communication between two or more functional elements.

The data network 255 includes one or more wired and/or wireless data networks. For example, the data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
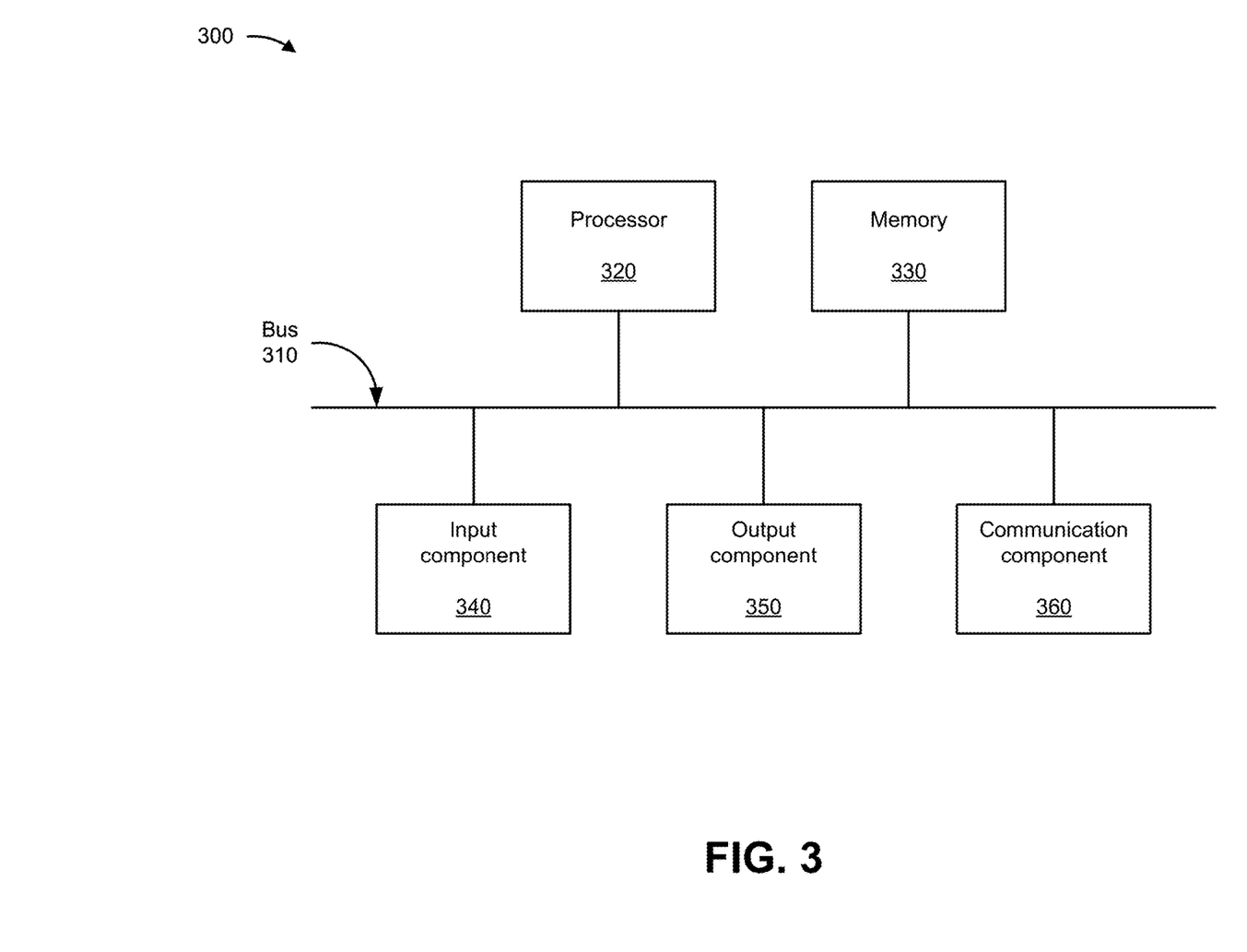
FIG. 3 is a diagram of example components of one or more devices of FIG. 2.

FIG. 3 is a diagram of example components of a device 300, which may correspond to the user device 105, the RAN 110, the SMF 120, the NSSF 205, the NEF 210, the AUSF 215, the UDM 220, the PCF 225, the AF 230, the AMF 235, the UPF 240, and/or the BSF 245. In some implementations, the user device 105, the RAN 110, the SMF 120, the NSSF 205, the NEF 210, the AUSF 215, the UDM 220, the PCF 225, the AF 230, the AMF 235, the UPF 240, and/or the BSF 245 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
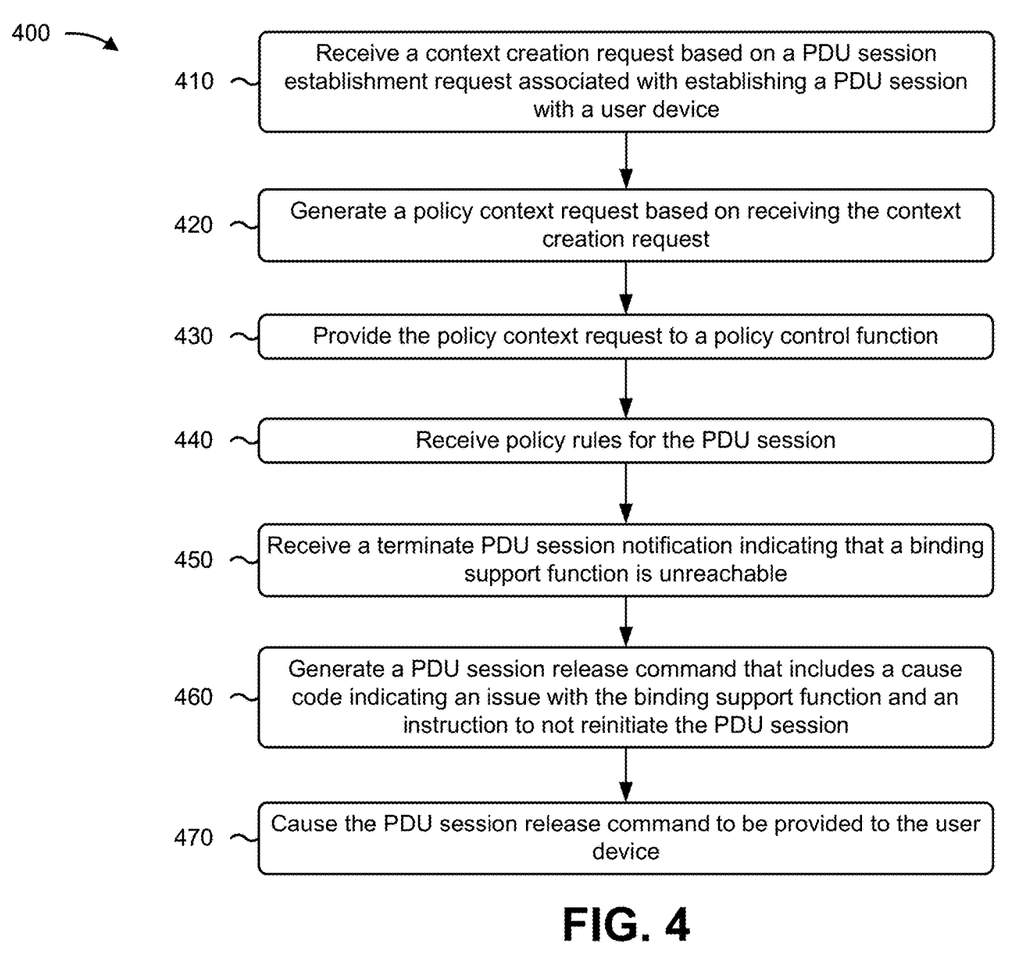
FIG. 4 is a flowchart of an example process for preventing user device pinging in asynchronous communication mode.

FIG. 4 is a flowchart of an example process 400 for preventing user device pinging in asynchronous communication mode. In some implementations, one or more process blocks of FIG. 4 may be performed by a network device (e.g., the SMF 120). In some implementations, one or more process blocks of FIG. 4 may be performed by another device or a group of devices separate from or including the network device, such as a RAN (e.g., the RAN 110), a PCF (e.g., the PCF 225), and/or an AMF (e.g., the AMF 235). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a context creation request based on a PDU session establishment request associated with establishing a PDU session with a user device (block 410). For example, the network device may receive a context creation request based on a PDU session establishment request associated with establishing a PDU session with a user device, as described above. In some implementations, the network device is an SMF. In some implementations, receiving the context creation request includes receiving the context creation request from an AMF that received the PDU session establishment request.

As further shown in FIG. 4, process 400 may include generating a policy context request based on receiving the context creation request (block 420). For example, the network device may generate a policy context request based on receiving the context creation request, as described above.

As further shown in FIG. 4, process 400 may include providing the policy context request to a policy control function (block 430). For example, the network device may provide the policy context request to a policy control function, as described above.

As further shown in FIG. 4, process 400 may include receiving policy rules for the PDU session (block 440). For example, the network device may receive, from the policy control function and based on the policy context request, policy rules for the PDU session, as described above. In some implementations, the policy control function is configured to provide the policy rules for the PDU session to the network device before successfully registering data network name session information with the binding support function.

As further shown in FIG. 4, process 400 may include receiving a terminate PDU session notification indicating that a binding support function is unreachable (block 450). For example, the network device may receive, from the policy control function, a terminate PDU session notification indicating that a binding support function is unreachable, as described above. In some implementations, the policy control function is configured to provide the terminate PDU session notification to the network device after attempting to and failing to register data network name session information with the binding support function. In some implementations, the policy control function is configured to provide the terminate PDU session notification to the network device after twice attempting to and failing to register data network name session information with the binding support function.

As further shown in FIG. 4, process 400 may include generating a PDU session release command that includes a cause code indicating an issue with the binding support function and an instruction to not reinitiate the PDU session (block 460). For example, the network device may generate, based on the terminate PDU session notification, a PDU session release command that includes a cause code indicating an issue with the binding support function and an instruction to not reinitiate the PDU session, as described above. In some implementations, the cause code indicating the issue with the binding support function is an NAS cause code. In some implementations, the PDU session release command instructs the user device to not reinitiate the PDU session. In some implementations, the issue with the binding support function is that the binding support function is nonoperational or a connection between the binding support function and the policy control function is nonoperational.

As further shown in FIG. 4, process 400 may include causing the PDU session release command to be provided to the user device (block 470). For example, the network device may cause the PDU session release command to be provided to the user device, as described above. In some implementations, causing the PDU session release command to be provided to the user device includes providing the PDU session release command to an AMF that received the PDU session establishment request, wherein the AMF is configured to provide the PDU session release command to the user device.

In some implementations, process 400 includes generating another policy context request based on receiving the terminate PDU session notification, and providing the other policy context request to another policy control function. In some implementations, process 400 includes receiving, from the other policy control function and based on the other policy context request, other policy rules for the PDU session, and receiving, from the other policy control function, another terminate PDU session notification indicating that the binding support function is unreachable. In some implementations, generating, based on the terminate PDU session notification, the PDU session release command includes generating the PDU session release command based on the terminate PDU session notification and the other terminate PDU session notification.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information. Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a network device, a context creation request based on a protocol data unit (PDU) session establishment request associated with establishing a PDU session with a user device;
    generating, by the network device, a policy context request based on receiving the context creation request;
    providing, by the network device, the policy context request to a policy control function;
    receiving, by the network device, from the policy control function, and based on the policy context request, policy rules for the PDU session;
    receiving, by the network device and from the policy control function, a terminate PDU session notification indicating that a binding support function is unreachable;
    generating, by the network device and based on the terminate PDU session notification, a PDU session release command that includes a cause code indicating an issue with the binding support function and an instruction to not reinitiate the PDU session; and
    causing, by the network device, the PDU session release command to be provided to the user device.

2. The method of claim 1, wherein the network device is a session management function.

3. The method of claim 1, further comprising:
    generating another policy context request based on receiving the terminate PDU session notification; and
    providing the other policy context request to another policy control function.

4. The method of claim 3, further comprising:
    receiving, from the other policy control function and based on the other policy context request, other policy rules for the PDU session; and
    receiving, from the other policy control function, another terminate PDU session notification indicating that the binding support function is unreachable.

5. The method of claim 4, wherein generating, based on the terminate PDU session notification, the PDU session release command comprises:
    generating the PDU session release command based on the terminate PDU session notification and the other terminate PDU session notification.

6. The method of claim 1, wherein the cause code indicating the issue with the binding support function is a non-access stratum cause code.

7. The method of claim 1, wherein the PDU session release command instructs the user device to not reinitiate the PDU session.

8. A network device, comprising:
    one or more processors configured to:
        receive a context creation request based on a protocol data unit (PDU) session establishment request associated with establishing a PDU session with a user device;
        generate a policy context request based on receiving the context creation request;
        provide the policy context request to a policy control function;
        receive, from the policy control function and based on the policy context request, policy rules for the PDU session;
        receive, from the policy control function, a terminate PDU session notification indicating that a binding support function is unreachable;
        generate, based on the terminate PDU session notification, a PDU session release command that includes a cause code indicating an issue with the binding support function and an instruction to not reinitiate the PDU session; and
        cause the PDU session release command to be provided to the user device,
            wherein the PDU session release command instructs the user device to not reinitiate the PDU session.

9. The network device of claim 8, wherein the one or more processors, to receive the context creation request, are configured to:

receive the context creation request from an access and mobility management function that received the PDU session establishment request.

10. The network device of claim 8, wherein the one or more processors, to cause the PDU session release command to be provided to the user device, are configured to:
provide the PDU session release command to an access and mobility management function that received the PDU session establishment request,
wherein the access and mobility management function is configured to provide the PDU session release command to the user device.

11. The network device of claim 8, wherein the issue with the binding support function is that the binding support function is nonoperational or a connection between the binding support function and the policy control function is nonoperational.

12. The network device of claim 8, wherein the policy control function is configured to provide the terminate PDU session notification to the network device after attempting to and failing to register data network name session information with the binding support function.

13. The network device of claim 8, wherein the policy control function is configured to provide the policy rules for the PDU session to the network device before successfully registering data network name session information with the binding support function.

14. The network device of claim 8, wherein the policy control function is configured to provide the terminate PDU session notification to the network device after twice attempting to and failing to register data network name session information with the binding support function.

15. A non-transitory computer-readable medium storing a set of instructions, the set of instructions comprising:
one or more instructions that, when executed by one or more processors of a network device, cause the network device to:
receive a context creation request based on a protocol data unit (PDU) session establishment request associated with establishing a PDU session with a user device;
generate a policy context request based on receiving the context creation request;
provide the policy context request to a policy control function;
receive, from the policy control function and based on the policy context request, policy rules for the PDU session;
receive, from the policy control function, a terminate PDU session notification indicating that a binding support function is unreachable;
generate another policy context request based on receiving the terminate PDU session notification;
provide the other policy context request to another policy control function;
receive, from the other policy control function and based on the other policy context request, other policy rules for the PDU session;
receive, from the other policy control function, another terminate PDU session notification indicating that the binding support function is unreachable;
generate, based on the other terminate PDU session notification, a PDU session release command that includes a cause code indicating an issue with the binding support function and an instruction to not reinitiate the PDU session; and
cause the PDU session release command to be provided to the user device.

16. The non-transitory computer-readable medium of claim 15, wherein the cause code indicating the issue with the binding support function is a non-access stratum cause code.

17. The non-transitory computer-readable medium of claim 15, wherein the PDU session release command instructs the user device to not reinitiate the PDU session.

18. The non-transitory computer-readable medium of claim 15, wherein the network device is a session management function.

19. The non-transitory computer-readable medium of claim 15, wherein the issue with the binding support function is that the binding support function is nonoperational or a connection between the binding support function and the policy control function is nonoperational.

20. The non-transitory computer-readable medium of claim 15, wherein the policy control function is configured to provide the terminate PDU session notification to the network device after attempting to and failing to register data network name session information with the binding support function.

* * * * *